United States Patent
Seo et al.

(10) Patent No.: US 8,861,332 B2
(45) Date of Patent: Oct. 14, 2014

(54) METHOD AND APPARATUS OF RECOVERING BACKHAUL LINK FAILURE BETWEEN BASE STATION AND RELAY NODE

(75) Inventors: Han Byul Seo, Anyang-si (KR); Hak Seong Kim, Anyang-si (KR); Byoung Hoon Kim, Anyang-si (KR); Ki Jun Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 13/578,588

(22) PCT Filed: Feb. 11, 2011

(86) PCT No.: PCT/KR2011/000922
§ 371 (c)(1),
(2), (4) Date: Aug. 10, 2012

(87) PCT Pub. No.: WO2011/099802
PCT Pub. Date: Aug. 18, 2011

(65) Prior Publication Data
US 2012/0314567 A1   Dec. 13, 2012

Related U.S. Application Data (60) Provisional application No. 61/303,670, filed on Feb. 11, 2010.

(51) Int. Cl.
*H04J 1/16* (2006.01)
*H04W 24/04* (2009.01)

(52) U.S. Cl.
CPC .................................. *H04W 24/04* (2013.01)
USPC ............................. 370/216; 370/242; 370/315

(58) Field of Classification Search
CPC ...... H04W 24/04; H04W 24/06; H04W 24/08; H04W 88/04
USPC .................................. 370/216–252, 315–338
See application file for complete search history.

(56) References Cited

U.S. PATENT DOCUMENTS

| | | | |
|---|---|---|---|
| 2008/0207200 A1 | 8/2008 | Fein et al. | |
| 2008/0219268 A1 | 9/2008 | Dennison | |
| 2009/0257353 A1 | 10/2009 | Song et al. | |
| 2011/0242970 A1* | 10/2011 | Prakash et al. | 370/225 |
| 2012/0142336 A1* | 6/2012 | Van Phan et al. | 455/423 |
| 2013/0182555 A1* | 7/2013 | Raaf et al. | 370/216 |

OTHER PUBLICATIONS

Chalermpol Charnsripinyo et al., "Topological Design of 3G Wireless Backhaul Networks for Service Assurance", International Workshop on Design of Reliable Communication Networks, Nov. 2005.

* cited by examiner

*Primary Examiner* — Kan Yuen
(74) *Attorney, Agent, or Firm* — Lee, Hong, Degerman, Kang & Waimey (57) ABSTRACT

A method and apparatus for recovering a backhaul link failure between a base station and a relay node is provided. The relay node receives information on a plurality of relay subframes used for relaying signals between the base station and the relay node. When a backhaul link failure is detected, the relay node determines at least one reserved subframe except the plurality of relay subframes and receives information to recover the backhaul link failure on a control channel in the at least one reserved subframe.

12 Claims, 9 Drawing Sheets

Fig. 15

METHOD AND APPARATUS OF RECOVERING BACKHAUL LINK FAILURE BETWEEN BASE STATION AND RELAY NODE

CROSS-REFERENCE TO RELATED APPLICATIONS

This application is the National Stage filing under 35 U.S.C. 371 of International Application No. PCT/KR2011/000922, filed on Feb. 11, 2011, which claims the benefit of U.S. Provisional Application Ser. No. 61/303,670, filed on Feb. 11, 2010, the contents of which are all incorporated by reference herein in their entirety.

TECHNICAL FIELD

The present invention related to wireless communication, and more particularly, to failure recovery in a backhaul link between a base station and a relay node in a wireless communication system.

BACKGROUND ART

In the International Telecommunication Union Radio communication sector (ITU-R), a standardization work for International Mobile Telecommunication (IMT)-Advanced (i.e., the next-generation mobile communication system after the third generation) is in progress. IMT-Advanced sets its goal to support Internet Protocol (IP)-based multimedia service at the data transfer rate of 1 Gbps in stop and slow-speed moving states and of 100 Mbps in a fast-speed moving state.

3GPP (3rd Generation Partnership Project) is a system standard which fulfills the requirements of IMT-Advanced, and it prepares improved LTE-Advanced (LTE-A) of LTE (Long Term Evolution) based on OFDMA (Orthogonal Frequency Division Multiple Access)/SC-FDMA (Single Carrier-Frequency Division Multiple Access) transmission schemes. The LTE-A is one of the strong candidates for IMT-Advanced. Relay node technology is included in the major technologies of the LTE-A.

A relay node (RN) is an apparatus for relaying signals between a base station and a user equipment (UE) and used to extend the cell coverage of a wireless communication system and improve the throughput.

A RN operating in the relaying mode (i.e., RN receives downlink backhaul signal from its base station in the backhaul subframes and forwards the relevant data to the associated relay UEs in the access subframes) sometimes suffers from the backhaul link failure due to some reasons such as the clock drift, channel information feedback error, or relocation of RN. If this link failure occurs in the backhaul link, the RN is not able to receive control channels and data channels, which implies that that RN cannot receive data to be forwarded to UEs anymore.

There is a need how to recover the above-mentioned backhaul link failure by the RN.

SUMMARY OF INVENTION

Technical Problem

The present invention provides a method and apparatus of recovering a backhaul link failure.

Solution to Problem

In an aspect, a method for recovering a backhaul link failure between a base station (BS) and a relay node (RN) is provided. The method includes receiving, by a RN from a BS, information on a plurality of relay subframes used for relaying signals between the BS and the RN, detecting, by a RN, a backhaul link failure while relaying the signals by using the plurality of relay subframes, when the backhaul link failure is detected, determining at least one reserved subframe except the plurality of relay subframes, and receiving information to recover the backhaul link failure on a control channel in the at least one reserved subframe.

The method may further include receiving, by the RN from the BS, information on the at least one reserved subframe.

The at least one reserved subframe may be predefined.

The at least one reserved subframe may include a first and sixth subframe of a radio frame.

The information to recover the backhaul link failure may include information on a dedicated random access preamble.

The backhaul link failure may be detected when the RN does not receive any downlink (DL) control signal from the BS during a given period of time, when the RN does not receive any uplink (UL) grant from the BS within a given period of time, or when the RN fails to decode a given consecutive number of DL data packets.

In another aspect, an apparatus for recovering a backhaul link failure with a base station (BS) is provided. The apparatus includes a radio frequency unit configured to send and receive radio signals, and a processor operatively connected to the radio frequency unit and configured for receiving, from a BS, information on a plurality of relay subframes used for relaying signals, detecting a backhaul link failure while relaying the signals by using the plurality of relay subframes, when the backhaul link failure is detected, determining at least one reserved subframe except the plurality of relay subframes, and receiving information to recover the backhaul link failure on a control channel in the at least one reserved subframe.

Advantageous Effects of Invention

A relay node can recover backhaul link failure since a rely node re-connect to a base station in some or all subframes.

MODE FOR THE INVENTION

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). 3GPP ($3^{rd}$ Generation Partnership Project) Long Term Evolution (LTE) is part of Evolved UTMS (E-UMTS) using E-UTRA. The 3GPP LTE adopts OFDMA in the downlink and SC-FDMA in the uplink. LTE-Advanced (LTE-A) is the evolution of 3GPP LTE. In order to clarify a description, 3GPP LTE/LTE-A is chiefly described as examples, but the technical spirit of the present invention is not limited thereto.

Figure 1:
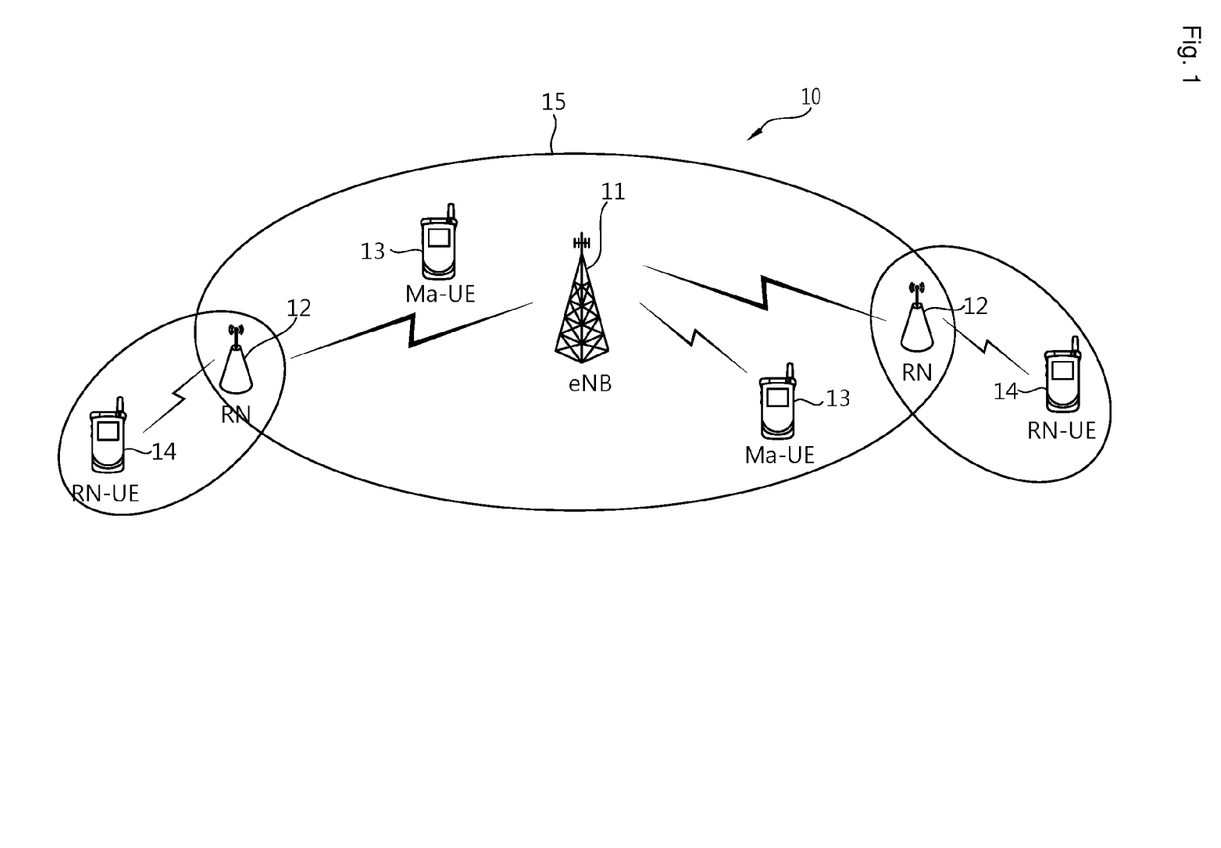
FIG. 1 is a diagram showing a wireless communication system including relay nodes.

FIG. 1 is a diagram showing a wireless communication system including relay nodes.

Referring to FIG. 1, a wireless communication system 10 includes a base station (BS) 11 and relay nodes (RNs). The eNB 11 provides communication services to a geographical area 15 called, in general, a cell. The cell can be divided into a plurality of areas. Each of the areas is called a sector. One or more cells can served by the base station 11. The BS 11 refers to a fixed station which communicates with an user equipment (UE) and/or a RN, and can also be referred to as another terminology, such as an evolved-NodeB (eNodeB), a base transceiver system (BTS), an access point, or an access network (AN). The eNB 11 can perform functions, such as connectivity, management, control, and resource allocation between a RN 12 and a UE 14.

The RN 12 refers to a device for relaying signals between the eNB 11 and the UE 14, and it can also be referred to as another terminology, such as a relay station or a repeater. Any method, such as AF (amplify and forward) or DF (decode and forward), can be used as a relay method used by an RN, but the technical spirit of the present invention is not limited thereto.

The UEs 13 and 14 can be fixed and mobile and also referred to as another terminology, such as a Mobile Station (MST), a User Terminal (UT), a Subscriber Station (SS), a wireless device, a Personal Digital Assistant (PDA), a wireless modem, a handheld device, and an Access Terminal (AT).

Hereinafter, a macro UE (hereinafter referred to as an Ma-UE) 13 refers to a UE directly communicating with the eNB 11. A relay node UE (hereinafter referred to as an RN-UE) 14 refers to a UE communicating with an RN. The Ma-UE 13 within the cell of the eNB 11 can communicate with the BS 11 via the RN 12 in order to improve the transfer rate according to a diversity effect.

Figure 2:
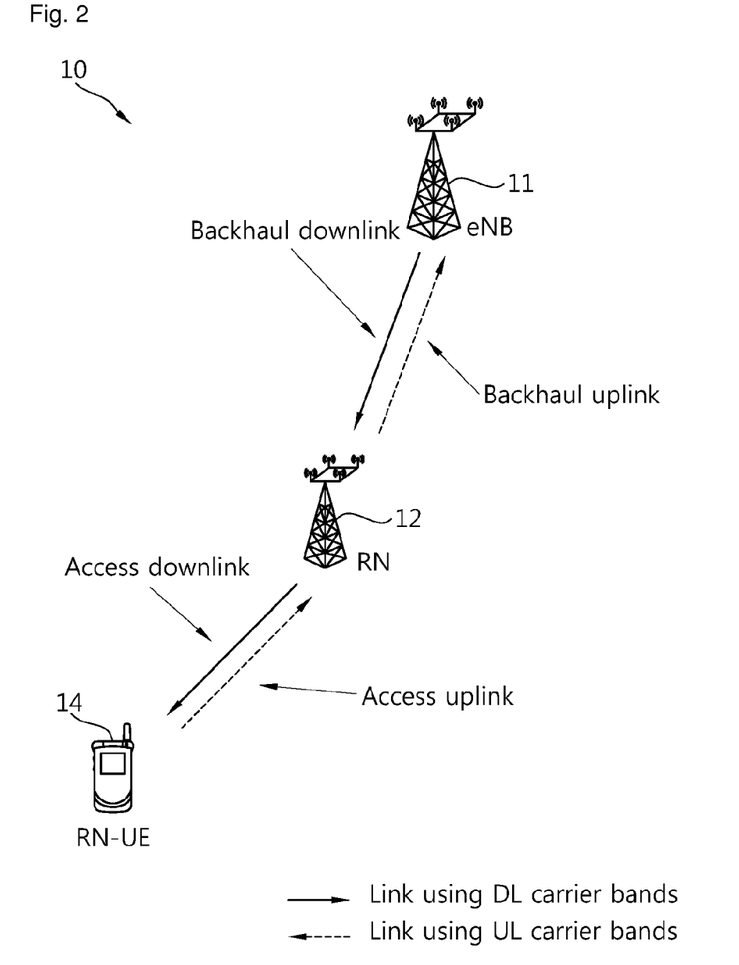
FIG. 2 is an exemplary diagram showing links existing in the wireless communication system including the RNs.

FIG. 2 is an exemplary diagram showing links existing in the wireless communication system including the RNs.

There can be a difference between a link in a wireless communication system in which an RN is placed between a BS and a UE and a link in a wireless communication system in which only a BS and a UE exists. Downlink between a BS and a UE refers to a communication link from the BS to the UE, and uplink therebetween refers to a communication link from the UE to the BS. In case where time division duplex (TDD) is used, downlink transmission and uplink transmission are performed in different subframes. In case where Frequency Division Duplex (FDD) is used, downlink transmission and uplink transmission are performed in different frequency bands. In TDD, downlink transmission and uplink transmission are performed in different times and the same frequency band can be used. Meanwhile, although downlink transmission and uplink transmission can be performed at the same time in FDD, different frequency bands are used.

In case where an RN is included between a BS and a UE, a backhaul link and an access link can be added in addition to the above-described uplink and downlink.

A backhaul link refers to a communication link between a BS and an RN. In backhaul downlink, the BS sends a signal to the RN. In backhaul uplink, the RN sends a signal to the BS. The backhaul link can be also referred to as a Un interface.

An access link refers to a communication link between an RN and a UE connected to the RN. In access downlink, the RN sends a signal to the UE. In access uplink, the RN-UE sends a signal to the RN. The access link can be also referred to as a UU interface.

Figure 3:
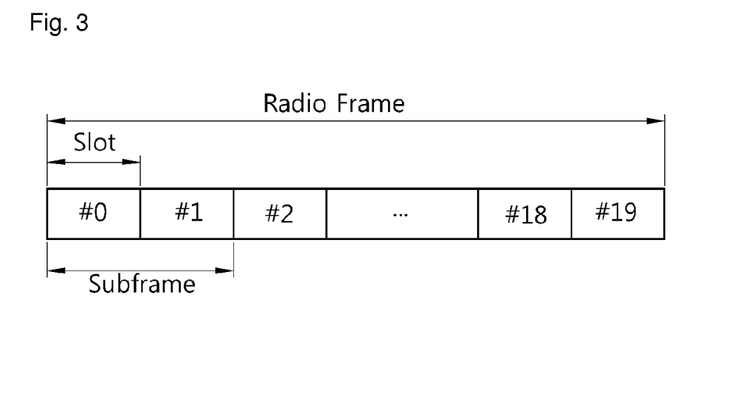
FIG. 3 is a diagram showing a radio frame structure of 3GPP LTE.

FIG. 3 is a diagram showing a radio frame structure of 3GPP LTE.

Referring to FIG. 3, a radio frame includes 10 subframes and one subframe includes two slots. The length of one subframe can be 1 ms, and the length of one slot can be 0.5 ms. The time that it takes to send one subframe is referred to as a Transmission Time Interval (TTI). The TTI can be a minimum unit of scheduling.

One slot can include a plurality of orthogonal frequency division multiplexing (OFDM) symbols in the time domain. An OFDM symbol is used to express one symbol period because 3GPP LTE uses OFDMA in the downlink and thus can be referred to as another terminology. For example, in case where SC-FDMA is used as an uplink multi-access method, the OFDM symbol can be said to be an SC-FDMA symbol. Although one slot is illustrated to include 7 OFDM symbols, the number of OFDM symbols included in one slot can be changed according to the length of a cyclic prefix (CP). In accordance with 3GPP TS 36.211 V8.5.0 (2008 December), in a normal CP, one subframe includes 7 OFDM symbols. In an extended CP, one subframe includes 6 OFDM symbols. The structure of a radio frame is only illustrative, and the number of subframes included in a radio frame and the number of slots included in a subframe can be changed in various ways. Hereinafter, a symbol can refer to one OFDM symbol or one SC-FDMA symbol.

For the structure of the radio frame described above with reference to FIG. 3, reference can be made to Paragraphs 4.1 and 4.2 of 3GPP TS 36.211 V8.3.0 (2008 May) "Technical Specification Group Radio Access Network; Evolved Universal Terrestrial Radio Access (E-UTRA); Physical Channels and Modulation (Release 8)".

Figure 4:
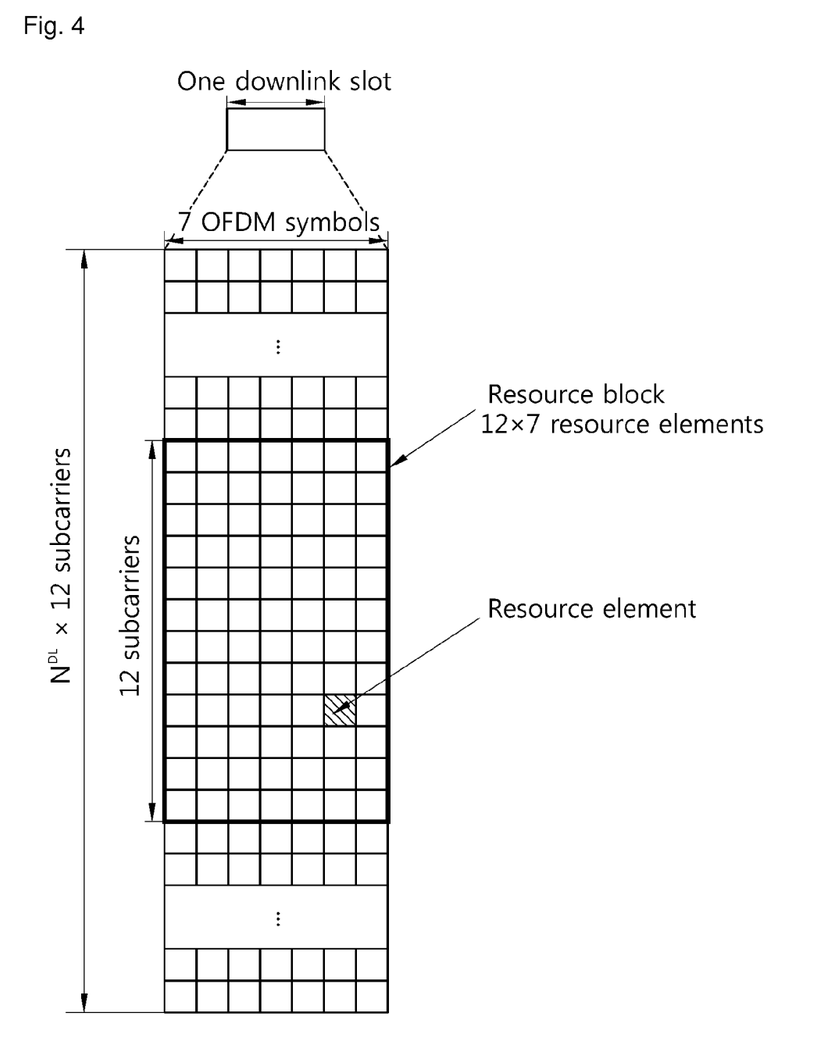
FIG. 4 is an exemplary diagram showing a resource grid for one downlink slot.

FIG. 4 is an exemplary diagram showing a resource grid for one downlink slot.

In a radio frame used in FDD or TDD, one slot includes a plurality of OFDM symbols in the time domain and a plurality of resource blocks (RBs) in the frequency domain. The resource block includes a plurality of contiguous subcarriers in one slot in the unit of resource allocation.

Referring to FIG. 4, one downlink slot is illustrated to include 7 OFDM symbols and one resource block is illustrated to include 12 subcarriers in the frequency domain, but not limited thereto. In the resource block, a subcarrier can have an interval of, for example, 15 KHz.

Each of elements on the resource grid is referred to as a resource element, and one resource block includes 12×7 resource elements. The number of resource blocks $N^{DL}$ included in a downlink slot depends on a downlink transmission bandwidth set in a cell. The resource grid shown in FIG. 4 can also be applied to uplink.

Figure 5:
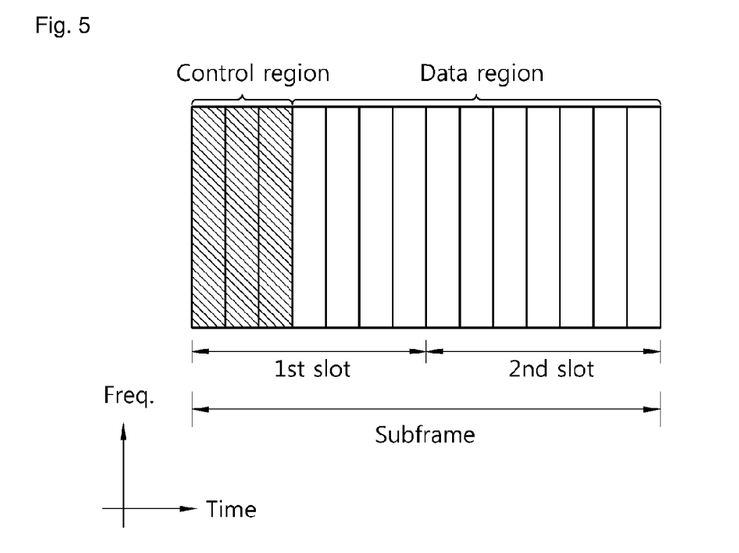
FIG. 5 is a diagram showing the structure of a downlink subframe.

FIG. 5 is a diagram showing the structure of a downlink subframe.

Referring to FIG. 5, the subframe includes two consecutive slots. 3 OFDM symbols anterior to the first slot within the subframe correspond to a control region to which Physical Downlink Control Channels (PDCCHs) are allocated, and the remaining OFDM symbols correspond to a data region to which Physical Downlink Shared Channels (PDSCHs) are allocated. Control channels, such as a Physical Control Format Indicator Channel (PCFICH) and a Physical HARQ Indicator Channel (PHICH) can also be allocated to the control region in addition to the PDCCHs. A UE can decode control information transmitted through a PDCCH and read data information transmitted through a PDSCH. In this case, although the control region is illustrated to include 3 OFDM symbols, two OFDM symbols or one OFDM symbol can be included in the control region. The number of OFDM symbols included in the control region within the subframe can be known through a PCFICH. The PHICH carries information indicating whether the reception of uplink data sent by a UE is successful or not. In other words, the PHICH carries an HARQ acknowledgment (ACK)/not-acknowledgment (NACK) signal.

Control information transmitted through the PDCCH is referred to as Downlink Control Information (hereinafter referred to as DCI). The DCI includes uplink scheduling information, downlink scheduling information, system information, a uplink power control command, control information for paging, control information to indicate an random access response (RACH response), and so on.

The control region includes a plurality of control channel elements (CCEs). The CCE column is a set of all CCEs which constitute the control region within one subframe. The CCE includes a plurality of resource element group (REG). For example, the CCE can include 9 REGs. The REG is used to define that a control channel is mapped to a resource element. For example, one REG can include 4 resource elements.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of transmission power control commands on individual UEs within an arbitrary UE group, a transmission power control command, activation of a voice over IP (VoIP), etc.

A plurality of PDCCHs can be transmitted within the control region. The PDCCH carries control information such as scheduling allocation. The PDCCH is transmitted on one CCE or an aggregation of several consecutive CCEs. A format and the number of bits of available PDCCHs are determined according to the number of CCEs constituting the CCE aggregation. The number of CCEs used for PDCCH transmission is referred to as a CCE aggregation level. Further, the CCE aggregation level is a CCE unit for searching for PDCCHs. The size of a CCE aggregation level is defined by the number of contiguous CCEs. For example, the CCE aggregation level can be an element of $\{1, 2, 4, 8\}$.

The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 6:
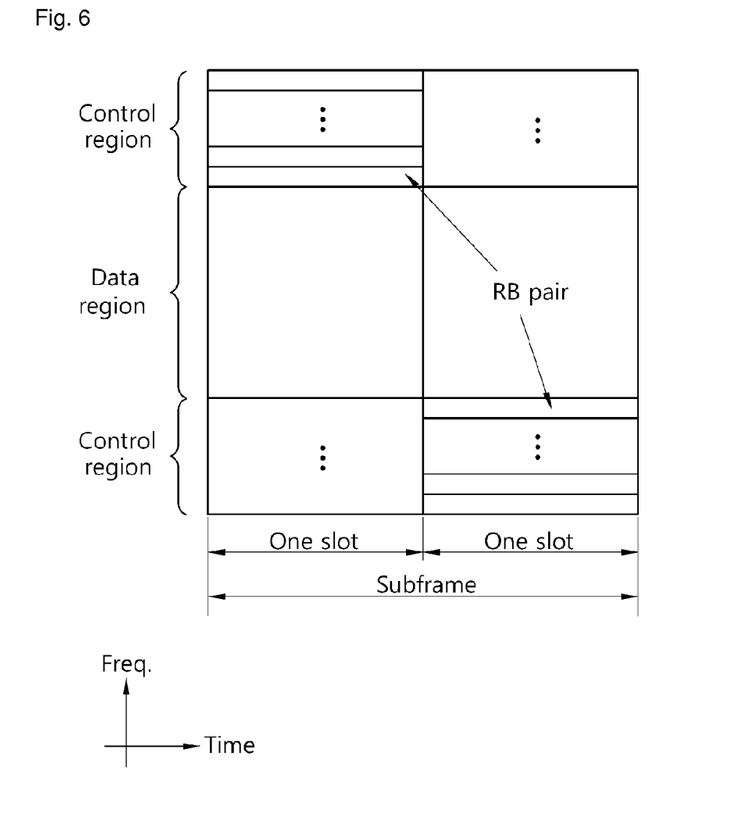
FIG. 6 is a diagram showing the structure of an uplink subframe.

FIG. 6 is a diagram showing the structure of an uplink subframe.

Referring to FIG. 6, the uplink subframe can be divided into a control region to which PUCCHs (Physical Uplink Control Channels) carrying uplink control information are allocated and a data region to which PUSCHs (Physical Uplink Shared Channels) carrying user data are allocated, in the frequency domain.

A PUCCH for one UE is allocated in the form of a pair of resource blocks (RBs) 51 and 52 in the subframe, and the RBs 51 and 52 belonging to the RB pair occupy different subcarriers in two slows. This is called that an RB pair allocated to PUCCHs is frequency-hopped in the slot boundary.

The PUCCH can support multiple formats. That is, the PUCCH can transmit uplink control information having a different bit number for every subframe according to a modulation scheme. For example, in case where Binary Phase Shift Keying (BPSK) is used (i.e., PUCCH format 1a), uplink control information of one bit can be transmitted on the PUCCH. In case where Quadrature Phase Shift Keying (QPSK) is used (i.e., PUCCH format 1b), uplink control information of 2 bits can be transmitted on the PUCCH. The PUCCH format can include a format 1, a format 2, a format 2a, and a format 2b in addition to the above formats (For the PUCCH formats, reference can be made to section 5.4 of 3GPP TS 36.211 V8.2.0 (2008 March) "Technical Specification Group Radio Access Network; Evolved Universal Terrestrial Radio Access (E-UTRA); Physical Channels and Modulation (Release 8)").

A wireless communication system (e.g., the wireless communication system described with reference to FIG. 1) can be a system using Multi-Input Multi-Output (MIMO) technology (i.e., an MIMO system). The MIMO technology has overcame technology using one transmission antenna and one reception antenna and is adopting multiple transmission antennas and multiple reception antennas in order to improve the transfer efficiency of data transmitted and received. In other words, the MIMO technology uses a plurality of antennas in the transmitter or receiver of a wireless communication system. If the MIMO technology is used, the performance and communication capacity of a wireless communication system can be improved. The MIMO system is also referred to as a multi-antenna system. The MIMO technology does not depend on a single antenna path in order to receive one entire message, but is an application of technology in which pieces of data received from several antennas are gathered and completed. Consequently, the data transfer rate can be improved in a specific range, or a system range for a specific data transfer rate can be increased.

The next-generation mobile communication technology requires a higher data transfer rate than a conventional mobile communication technology. Accordingly, the MIMO technology can be said to be indispensable for the next-generation mobile communication technology. The MIMO technology can be applied to not only a BS, but also a UE or an RN in order to overcome the limitations of the data transfer rate. Further, the MIMO technology is technically advantageous in that it can improve the data transfer efficiency without using additional frequency bands or requiring additional transmission power and thus has been in the spotlight as compared with other technologies.

First, the mathematical modeling of an MIMO system is described.

Figure 7:
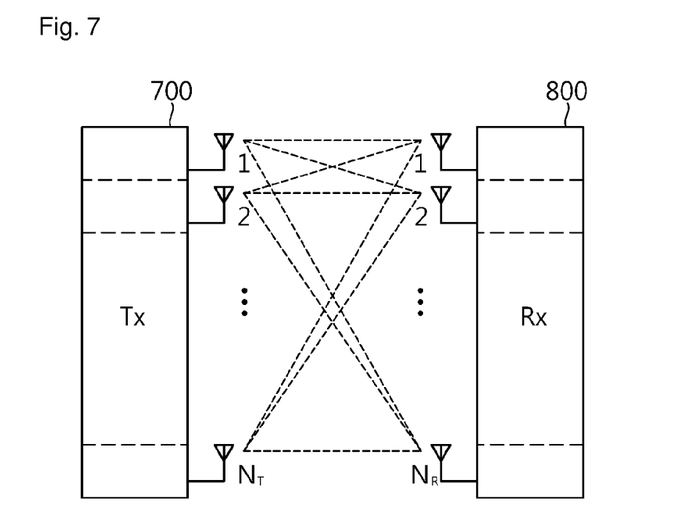
FIG. 7 is a diagram showing an MIMO system.

FIG. 7 is a diagram showing an MIMO system.

Referring to FIG. 7, a transmitter (Tx) 700 have $N_T$ transmission antennas, and a receiver (Rx) 800 have $N_R$ reception antennas. In this case, a theoretical channel transmission capacity is increased in proportion to the number of antennas.

A transfer rate acquired by an increasing channel transmission capacity can be represented by the product of a maximum transfer rate $R_0$ theoretically acquired when a single antenna is used and a rate increment $R_i$ generated when multiple antennas are used. The rate increment $R_i$ can be represented by the following equation.

$$R_i = \min(N_T, N_R) \quad \text{[Equation 1]}$$

Transmission information can include a maximum of $N_T$ different pieces of information in case where the number of transmission antennas is $N_T$. In this case, the transmission information can be represented by the following equation 2.

$$s = [s_1, s_2, \ldots, s_{N_T}]^T \quad \text{[Equation 2]}$$

In Equation 2, s indicates a transmission information vector, and $s_1, s_2, \ldots, s_{N_T}$ indicate respective pieces of information (i.e., respective elements of the transmission information vector). Each piece of information can be transmitted with a different transmission power. In case where the transmission powers are denoted by $P_1, P_2, \ldots, P_{N_T}$, a transmission information vector to which the transmission powers have been applied can be represented by the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 can be represented by the product of a transmission power diagonal matrix and a transmission information vector as in the following equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The transmission information vector
$\hat{s}$
to which the transmission powers have been applied is multiplied by a weight matrix W, thereby generating transmission signals $x_1, x_2, \ldots, x_{N_T}$ which are actually transmitted through $N_T$ transmission antennas. The weight matrix W functions to properly distribute pieces of transmission information into respective antennas according to transmission channel conditions. Assuming that the transmission signal vector is x, the transmission signal vector can be represented by the following equation.

$$x = \begin{bmatrix} x_1 \\ x_2 \\ \vdots \\ x_i \\ \vdots \\ x_{N_T} \end{bmatrix} = \quad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In Equation 5, an element $w_{ij}$ ($1 \leq i \leq N_T$, $1 \leq j \leq N_T$) of the weight matrix indicates a weight for an $i^{th}$ transmission antenna and $j^{th}$ transmission information. The weight matrix W is also referred to as a precoding matrix.

A transmission signal vector can include a different piece of transmission information according to a transmission scheme. For example, in case where a spatial diversity (i.e., transmit diversity) is applied, the transmission signal vector can have the same transmission information. That is, $[s_1, s_2, \ldots, s_{nT}]$ can be the same information (e.g., $[s_1, s_1, \ldots, s_1]$). Since the same transmission information is transferred to a receiver through different channels, a diversity effect is increased and so the reliability of transmission is increased.

For another example, in case where spatial multiplexing is applied, the transmission signal vector can have a different piece of transmission information. That is, $s_1, s_2, \ldots, s_{nT}$ can have different pieces of information. Since different pieces of transmission information are transferred to a receiver through different channels, there is an advantage in that the amount of transmission information is increased.

In some cases, both the spatial diversity and the spatial multiplexing may be used to send transmission information. That is, in the above example, the same information may be transmitted through three transmission antennas in accordance with the spatial diversity, and different pieces of information may be transmitted through the remaining transmission antennas in accordance with the spatial multiplexing. In such a case, the transmission information vector can be configured as in, for example, $[s_1, s_1, s_1, s_2, s_3, \ldots, s_{nT-2}]$.

In case where the number of reception antennas of a receiver is $N_R$, a signal received by each reception antenna can be denoted by $y_n$ ($1 \leq n \leq N_R$). Here, a reception signal vector y can be represented by the following equation.

$$y = [y_1, y_2, \ldots, y_{N_R}]^T \quad \text{[Equation 6]}$$

In case where channel modeling is performed in an MIMO system, channels can be distinguished from each other on the basis of the indices of transmission antennas and the indices of reception antennas. Assuming that the index of the transmission antenna is j and the index of the reception antenna is i, a channel between the transmission antenna and the reception antenna can be denoted by $h_{ij}$ (It should be noted that in subscripts denoting channels, the index of a reception antenna is first indicated and the index of a transmission antenna is then indicated).

Figure 8:
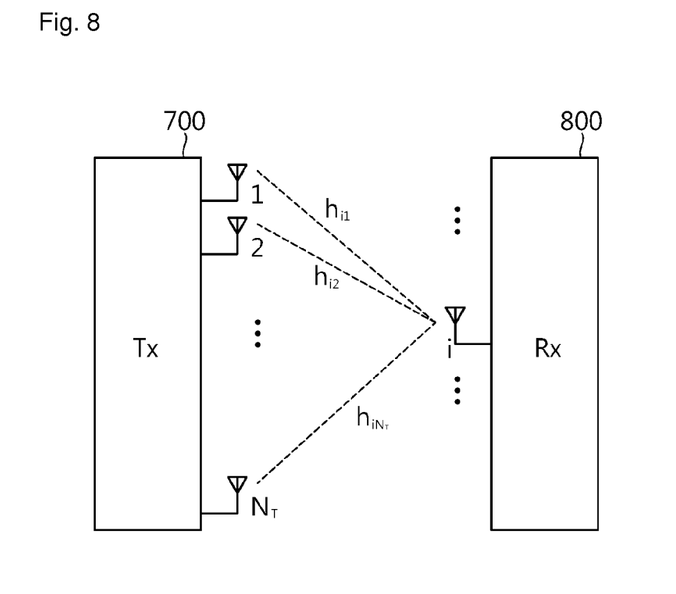
FIG. 8 is an example showing channels in a multi-antenna system.

FIG. 8 is an example showing channels in a multi-antenna system.

Referring to FIG. 8, channels for respective $N_T$ transmission antennas and a reception antenna i are denoted by $h_{i1}, h_{i2}, \ldots, h_{iN_T}$, respectively. The channels can be represented by a matrix or a vector, for convenience sake. In this case, the channels $h_{i1}, h_{i2}, \ldots, h_{iN_T}$, can be represented in the form of a vector as in the following equation.

$$h_i^T = [h_{i1}, h_{i2}, \ldots, h_{iN_T}] \quad \text{[Equation 7]}$$

Assuming that the indication of all channels from an $N_T$ number of transmission antennas to an $N_R$ number of reception antennas in the form of a matrix is a channel matrix H, H can be represented by the following equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

A signal transmitted through transmission antennas is received by reception antennas via the channels shown in Equation 8. Here, in actual channels, noise is added. Such noise can be mathematically considered as Additive White Gaussian Noise (AWGN). Assuming that AWGNs added to respective reception antennas are denoted by $n_1, n_2, \ldots, n_{NR}$, respectively, the AWGNs can be represented by vectors as in the following equation, for convenience sake.

$$n = [n_1, n_2, \ldots, n_{N_R}]^T \quad \text{[Equation 9]}$$

A reception signal vector y received by the reception antennas can be represented by the following equation with consideration taken of the above-described AWGN, transmission signal vector x, and channel matrix, etc.

$$y = \begin{bmatrix} y_1 \\ y_2 \\ \vdots \\ y_i \\ \vdots \\ y_{N_R} \end{bmatrix} = \quad \text{[Equation 10]}$$

$$\begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

In the channel matrix H, the number of rows and the number of columns are determined by the number of transmission antennas and the number of reception antennas. In the channel matrix H, the number of rows is equal to the number of reception antennas. Further, in the channel matrix H, the number of columns is equal to the number of transmission antennas. Accordingly, the channel matrix H can be represented by an $N_R \times N_T$ matrix.

In general, the rank of a matrix is defined by a smaller one of the number of independent rows and the number of independent columns. Accordingly, the rank of a matrix is not greater than the number of columns or the number of rows, and the rank of the channel matrix H is determined as in the following equation.

$$\text{rank}(H) \leq \min(N_T, N_R) \quad \text{[Equation 11]}$$

In general, transmission information (e.g., data) is easily distorted or changed during the time for which it is transmitted through radio channels. Accordingly, in order to demodulate the transmission information without such errors, a reference signal is necessary. The reference signal is previously known to both a transmitter and a receiver and transmitted together with the transmission information. The transmission information transmitted by the transmitter experiences a channel corresponding to each transmission antenna or each layer, and so the reference signal can be allocated to each transmission antenna or each layer. The reference signals allocated to the respective transmission antennas or the respective layers can be distinguished from each other on the basis of resources, such as time, frequencies, and codes. The reference signal can be used for two kinds of purposes (i.e., the demodulation of transmission information and channel estimation).

The reference signal can be classified into two kinds according to the range of a receiver which previously knows the reference signal. The first kind of the reference signal is a reference signal known to a specific receiver (e.g., a specific UE). Such a reference signal is referred to as a Dedicated Reference Signal (hereinafter referred to as a DRS). In this sense, the DRS is also referred to as a UE-specific RS. The second kind of the reference signal is a reference signal known to all receivers (e.g., all UEs) within a cell. Such a reference signal is referred to as a Common RS (hereinafter referred to as a CRS). The CRS is also referred to as a cell-specific RS.

Further, the reference signals may be classified according to their purposes. For example, a reference signal used to demodulate data is referred to as a Demodulation Reference Signal (hereinafter referred to as a DM-RS). A reference signal used for feedback information indicative of channel states, such as a CQI, a PMI, and an RI, is referred to as a Channel State Indicator-RS (hereinafter referred to as a CSI-RS). The above DRS can be used as a DM-RS. Hereinafter, it is assumed that a DM-RS is a DRS.

Figure 9:
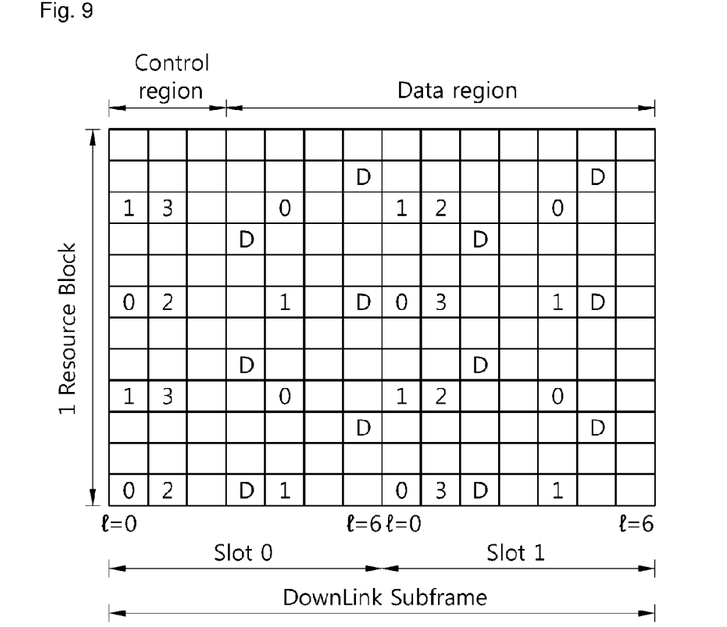
FIG. 9 is a diagram showing an example of an RS structure which can support four antenna ports in a normal CP.
Figure 10:
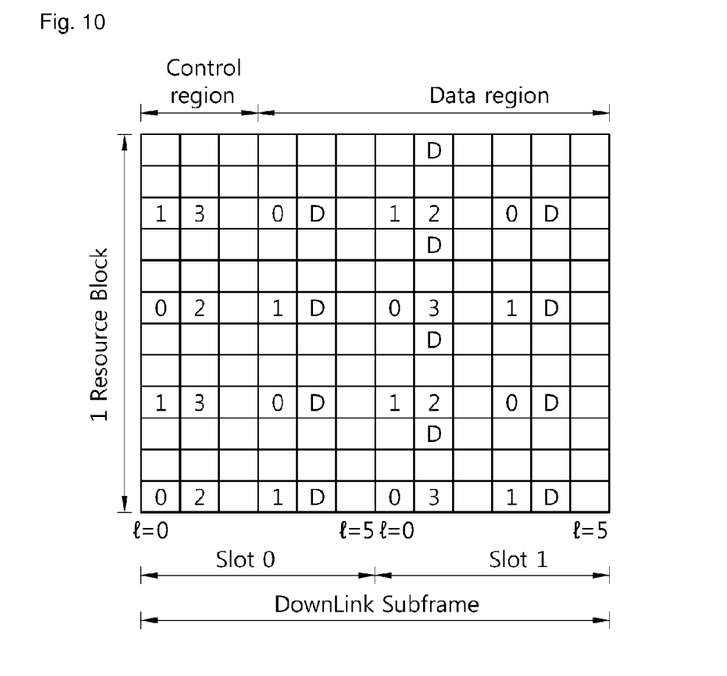
FIG. 10 is a diagram showing an example of an RS structure which can support four antenna ports in an extended CP.

FIG. 9 is a diagram showing an example of an RS structure which can support four antenna ports in a normal CP. FIG. 10 is a diagram showing an example of an RS structure which can support four antenna ports in an extended CP. The RS structures of FIGS. 9 and 10 are used in a conventional 3GPP LTE system.

In FIGS. 9 and 10, a resource element indicated by any one of numbers 0 to 3 denotes a resource element in which a cell-specific reference signal (i.e., a CRS) is transmitted. Here, any one of the numbers 0 to 3 indicates a supported antenna port. In other words, a resource element indicated by #i (where i is any one of the numbers 0 to 3) is a resource element to which a CRS for the antenna port #i is mapped. The CRS is used for channel measurement and data demodulation for each antenna port. The CRS is transmitted both in the control region and data region of a subframe.

In FIGS. 9 and 10, a resource element indicated by D indicates a resource element to which a UE-specific RS (i.e., a DRS) is mapped. The UE-specific RS can be used to transmit a single antenna port of a PDSCH. A UE is informed via high-layer signaling whether a UE-specific RS is transmitted and whether a UE-specific RS is valid in case where PDSCHs are transmitted. The UE-specific RS can be transmitted only when data need to be demodulated. The UE-specific RS can be transmitted only in the data region of a subframe.

On the other hand, RS mapping rules into resource block are following as Equations.

Equation 12 shows CRS mapping rules into resource block $$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_3 \bmod 2) & \text{if } p = 3 \end{cases}$$

$$v_{shift} = N_{ID}^{cell} \bmod 6$$

Equation 13 shows DRS mapping rules into resource block.

normal C  [Equation 13]

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3 N_{RB}^{PDSCH} - 1$$

extended CP $$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4 N_{RB}^{PDSCH} - 1$$

$$v_{shift} = N_{ID}^{cell} \bmod 3$$

Here, k and p mean subcarrier index and antenna port. And $N_{RB}^{DL}$, $n_s$, $N_{ID}^{cell}$ mean number of RB allocated for DL, slot index, cell ID. Note that given RS positioning depends on $V_{shift}$ values in terms of frequency domain.

In order to reach the requirement of LTE-advanced, coordinated multipoint transmission and reception (CoMP; usually renamed as co-MIMO, collaborative MIMO, network MIMO, etc.) has been proposed so far for system performance enhancement. CoMP is expected to increase cell-edge UE performance and enhance average sector throughput. In general, inter-cell interference (ICI) reduces cell-edge UE performance and average sector throughput under multi-cell environment with frequency reuse factor 1. To mitigate ICI, the simple passive technique (i.e., fractional frequency reuse (FFR) with UE specific power control) was employed in LTE system in order to provide reasonable throughput performance for the cell-edge UEs in the interference-limited environment. Instead of reducing frequency resource usage per cell, it is more beneficial to reuse ICI as a desired signal or mitigate the ICI.

For downlink case, CoMP schemes can be categorized as follows:

Joint Processing (JP): data is available at each point in CoMP cooperating set

Joint Transmission: PDSCH is transmitted from multiple points (part of or entire CoMP cooperating set) at a time. Data to a single UE is simultaneously transmitted from multiple transmission points, e.g. to (coherently or non-coherently) improve the received signal quality and/or cancel actively interference for other Ues Dynamic cell selection: PDSCH is transmitted from one point at a time (within CoMP cooperating set)

Coordinated Scheduling/Beamforming (CS/CB): Data is only available at serving cell (data transmission from that point) but user scheduling/beamforming decisions are made with coordination among cells corresponding to the CoMP cooperating set.

For uplink case, coordinated multi-point reception implies reception of the transmitted signal at coordination among multiple, geographically separated points and CoMP schemes can be categorized as follows:

1. Joint reception (JR): Transmitted signal of PUSCH is received at multiple reception points.

2. Coordinated Scheduling/Beamforming (CS/CB): PUSCH is received only at a one point but user scheduling/beamforming decisions are made with coordination among cells corresponding to the CoMP cooperating set.

The sounding reference signal (SRS), which are not associated with uplink data and/or control transmission, are primarily used for channel quality estimation to enable frequency-selective scheduling on the uplink. However, they can be used for other purposes such as to enhance power control or to support various start-up functions for UEs not recently scheduled. Some examples include initial Modulation and Coding Scheme (MCS) selection, initial power control for data transmissions, timing advance, and so-called frequency semi-selective scheduling in which the frequency resource is assigned selectively for the first slot of a subframe and hops pseudorandomly to a different frequency in the second slot. In addition, SRS can be used for downlink channel quality estimation under the assumption that the wireless channel is reciprocal between the uplink and downlink. This assumption is especially valid in a time division duplex (TDD) system where the uplink and downlink share the same frequency spectrum and are separated in time domain.

The subframes in which SRS are transmitted by any UE within the cell are indicated by cell-specific broadcast signalling. A 4-bit cell-specific 'srsSubframeConfiguration' parameter indicates 15 possible sets of subframes in which SRS may be transmitted within each radio frame. This configurability provides flexibility in adjusting the SRS overhead depending on the deployment scenario. A 16th configuration switches the SRS off completely in the cell, which may for example be appropriate for a cell serving primarily high-speed UEs.

Figure 11:
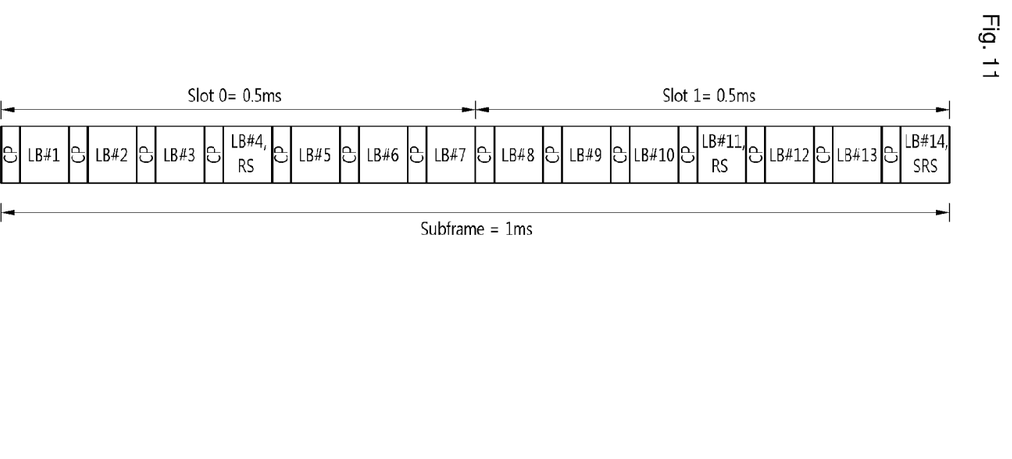
FIG. 11 is a diagram showing uplink subframe configuration with SRS symbol.

FIG. 11 is a diagram showing uplink subframe configuration with SRS symbol.

Referring to FIG. 11, the SRS transmissions are always in the last SC-FDMA symbol in the configured subframes. Thus the SRS and DM RS are located in different SC-FDMA symbols. PUSCH data transmission is not permitted on the SC-FDMA symbol designated for SRS, resulting in a worst-case sounding overhead (with an SRS symbol in every subframe) of 7%.

Each SRS symbol is generated by basis sequences (random sequence or ZC-based sequence set) where for a given time instance and bandwidth all the UEs in a cell use a same basis sequence while SRS transmissions from multiple UEs in a same time and band in a cell are distinguished orthogonally by different cyclic shifts of the basis sequence assigned to different UEs. SRS sequences from different cells can be distinguished by assigning different basis sequences in different cells where orthogonality is not guaranteed between different basis sequences.

Relaying is considered as a tool to improve e.g. the coverage of high data rates, group mobility, temporary network deployment, the cell-edge throughput and/or to provide coverage in new areas. The relay node is wirelessly connected to the radio-access network via a donor cell. With respect to the relay node's usage of spectrum, its operation can be classified into inband and outband.

In inband case, the BS-relay link shares the same carrier frequency with relay-UE links. UEs in LTE release 8, should be able to connect to the donor cell in this case. In outband case, the BS-relay link does not operate in the same carrier frequency as relay-UE links. UEs in LTE release 8 should be able to connect to the donor cell in this case.

With respect to the knowledge in the UE, relays can be classified into transparent and non-transparent. In transparent case, the UE is not aware of whether or not it communicates with the network via the relay. In non-transparent case, the UE is aware of whether or not it is communicating with the network via the relay.

Depending on the relaying strategy, a relay may be part of the donor cell or control cells of its own In the case that the relay is part of the donor cell, the relay does not have a cell identity of its own (but may still have a relay ID). At least part of the radio resource management (RRM) is controlled by the BS to which the donor cell belongs, while parts of the RRM may be located in the relay. In this case, a relay should preferably support also UEs in LTE release 8. Smart repeaters, decode-and-forward relays, different types of L2 relays, and Type 2 relay are examples of this type of relaying.

In the case the relay is in control of cells of its own, the relay controls one or several cells and a unique physical-layer cell identity is provided in each of the cells controlled by the relay. The same RRM mechanisms are available and from a UE perspective there is no difference in accessing cells controlled by a relay and cells controlled by a "normal" BS. The cells controlled by the relay should support also UEs in LTE release 8. Self-backhauling (L3 relay), "Type 1 relay nodes" and "Type 1a relay nodes" use this type of relaying.

At least "Type 1" and "Type 1a" relay nodes are part of LTE-Advanced.

A "Type 1" relay node is an inband relaying node characterized by the following. It controls cells, each of which appears to a UE as a separate cell distinct from the donor cell. The cells shall have their own Physical Cell ID (defined in LTE Rel-8) and the relay node shall transmit its own synchronization channels, reference symbols, etc. In the context of single-cell operation, the UE shall receive scheduling information and HARQ feedback directly from the relay node and send its control channels (SR/CQI/ACK) to the relay node. It shall appear as a Rel-8 BS to Rel-8 UEs (i.e. be backwards compatible). To LTE-Advanced UEs, it should be possible for a relay node to appear differently than Rel-8 BS to allow for further performance enhancement.

A "Type 1a" relay node is characterised by the same set of features as the "Type 1" relay node above, except "Type 1a" operates outband. A "Type 1a" relay node is expected to have little or no impact on RAN1 specifications.

A "Type 2" relay node is an inband relaying node characterized by the following: It does not have a separate Physical Cell ID and thus would not create any new cells. It is transparent to Rel-8 UEs; a Rel-8 UE is not aware of the presence of a Type 2 relay node. It can transmit PDSCH. At least, it does not transmit CRS and PDCCH.

In order to allow inband relaying, some resources in the time-frequency space are set aside for the backhaul link and cannot be used for the access link. At least the following scheme will be supported for this resource partitioning.

The first scheme is general principle for resource partitioning at the relay. BS→RN and RN→UE links are time division multiplexed in a single carrier frequency (only one is active at any time). RN→BS and UE→RN links are time division multiplexed in a single carrier frequency (only one is active at any time).

The second scheme is multiplexing of backhaul links in FDD. BS→RN transmissions are done in the DL frequency band. RN→BS transmissions are done in the UL frequency band The third scheme is multiplexing of backhaul links in TDD. BS→RN transmissions are done in the DL subframes of the BS and RN. RN→BS transmissions are done in the UL subframes of the BS and RN.

Due to the relay transmitter causing interference to its own receiver, simultaneous BS-to-relay and relay-to-UE transmissions on the same frequency resource may not be feasible unless sufficient isolation of the outgoing and incoming signals is provided e.g. by means of specific, well separated and well isolated antenna structures. Similarly, at the relay it may not be possible to receive UE transmissions simultaneously with the relay transmitting to the BS.

Figure 12:
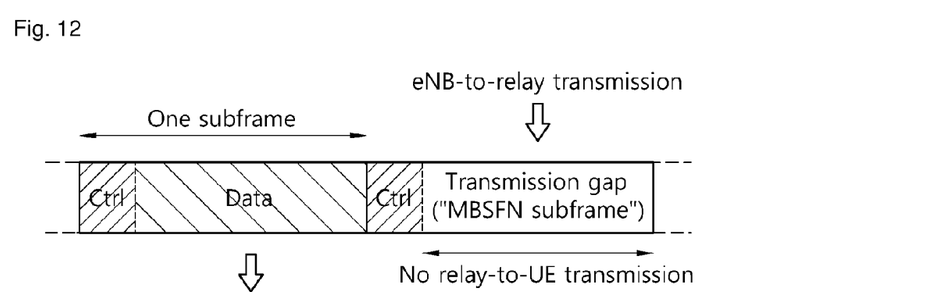
FIG. 12 shows an example of relay-to-UE communication using normal subframes and eNodeB-to-relay communication using (MBSFN) subframes.

FIG. 12 shows an example of relay-to-UE communication using normal subframes and BS-to-relay communication using (MBSFN) subframes.

Referring to FIG. 12, one possibility to handle the interference problem is to operate the relay such that the relay is not transmitting to terminals when it is supposed to receive data from the donor BS, i.e. to create "gaps" in the relay-to-UE transmission. These "gaps" during which terminals (including terminals in LTE release 8) are not supposed to expect any relay transmission can be created by configuring MBSFN subframes.

A MBSFN subframe is a special subframe in which a BS and a RN transmit control channels such as PCFICH, PHICH, PDCCH in the first one or two OFDM symbols along with CRS. The MBSFN subframe may be referred to as a relay subframe. So, relay-UEs which are UEs attached to the RN can perform the usual measurement procedure by using the first one or two OFDM symbols in which the RN is involved in the relay-to-UE transmission. UEs in LTE release 8 and 9 do not expect any signal from the serving BS in the data region of MBSFN subframes which follows the above-mentioned control region. So, the RN is allowed to stop its relay-to-UE transmission in those data region of MBSFN subframes without impacting on the UE measurement. BS-to-relay signal can be transmitted in the OFDM symbols in which the relay node stops its transmission. Relay-to-BS transmissions can be facilitated by not allowing any terminal-to-relay transmissions in some subframes.

Techniques to recover a RN from the backhaul link failure are described below.

First, terminologies are defined for convenience sake. Hereinafter, an R-PDCCH refers to a PDCCH in which control information is transmitted from a BS to an RN, and an R-PDSCH refers to a PDSCH in which traffic data are transmitted from a BS to an RN. Hereinafter, an x region refers to a radio resource region in which x is transmitted. For example, an R-PDCCH region refers to a radio resource region in which R-PDCCHs are transmitted by a BS.

In a relay mode, a RN receives DL backhaul signal from its BS in the backhaul subframes and forwards the relevant data to the associated relay UEs in the access subframes. The RN operating in the relaying mode may suffer from a backhaul link failure due to some reasons such as the clock drift, channel information feedback error, or relocation of RN. If the backhaul link failure occurs, the RN is not able to receive R-PDCCH/R-PDSCH, which implies that that RN cannot receive data to be forwarded to UEs anymore.

Figure 13:
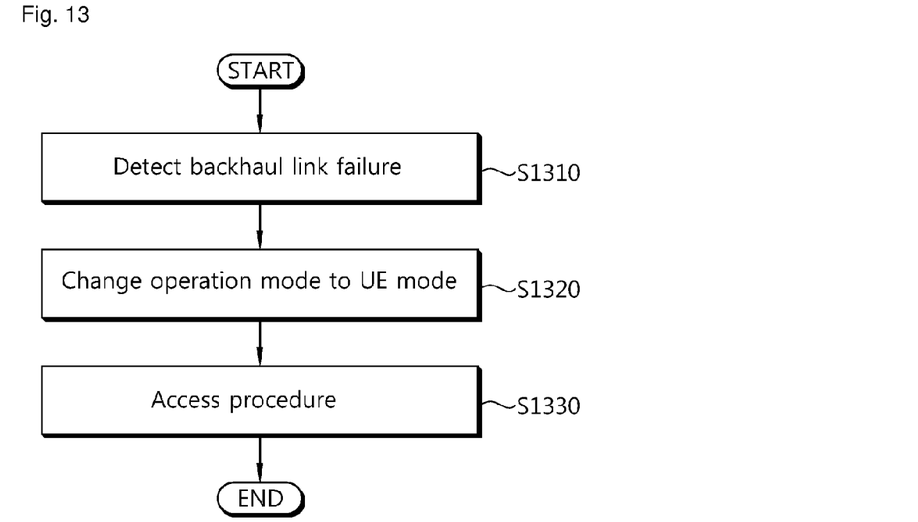
FIG. 13 is a flow chart showing a method recovering a RN from the backhaul link failure.

FIG. 13 is a flow chart showing a method for recovering the backhaul link failure.

Referring to FIG. 13, a RN detects a backhaul link failure at step S1310. Several possibilities can be considered as the criterion of the backhaul link failure detection. For example, the RN may regard it as an occurrence of the backhaul link failure if it does not receive any DL control signal during a given time. For another example, the RN may regard it as an occurrence of the backhaul link failure if it does not receive the corresponding UL grant within a given period of time after it transmits a given number of scheduling requests. For another example, the RN may regard it as an occurrence of the backhaul link failure if it fails to decode a given consecutive number of DL data packets (e.g., R-PDSCH).

The RN changes operation mode from relay mode to UE mode at step S1320. That is enforcing a RN which detects the backhaul link failure to go into the operation in the UE mode.

In the UE mode, the RN does not send any signal to the associated relay UEs and performs the same operation as a UE directly connected to its BS (e.g., receives DL signal from its BS in some or all the subframes). Note that a half-duplex RN may receive DL control via R-PDCCH in the relaying mode but may receive DL control via PDCCH in the UE mode.

Once RN transitions to the UE mode, it attempts an access procedure which is similar to (or equivalent to) the initial access procedure in order to re-connect itself to the BS at step S1330. For example, it decodes Broadcast Channel (BCH) of the BS to get the Random Access Channel (RACH) configuration and transmits a random access preamble to the BS accordingly. To facilitate fast recovery from the link failure, the BS can reserve one or more RACH preamble(s) for the purpose of the RN's access.

The RN may be in the UE mode in some subframes. If the backhaul link failure occurs, the RN transitions to the UE mode in one or more subframes to communicate with the BS. A subframe in which the RN is operated in the UE mode is called as a reserved subframe. A subframe in which the RN is not operated after transitioning to the UE mode is called as a disabled subframe.

One or more reserved subframes may be selected from subframes in one or more radio frames or configured MBSFN subframes. The reserved subframe may be predefined between the BS and the RN. The BS may send information for the reserved subframe to the RN.

The RN operates in the relay mode while receiving R-PDCCH by using MBSFN subframes. When the backhaul link failure is detected, the RN transitions to the UE mode and reads a PDCCH in the reserved subframe. Information to recover the backhaul link failure and to establish connection between the BS and the RN may be transmitted on the PDDCH in the reserved subframe. The information on the PDCCH may include a dedicated random access preamble and/or synchronization information.

Figure 14:
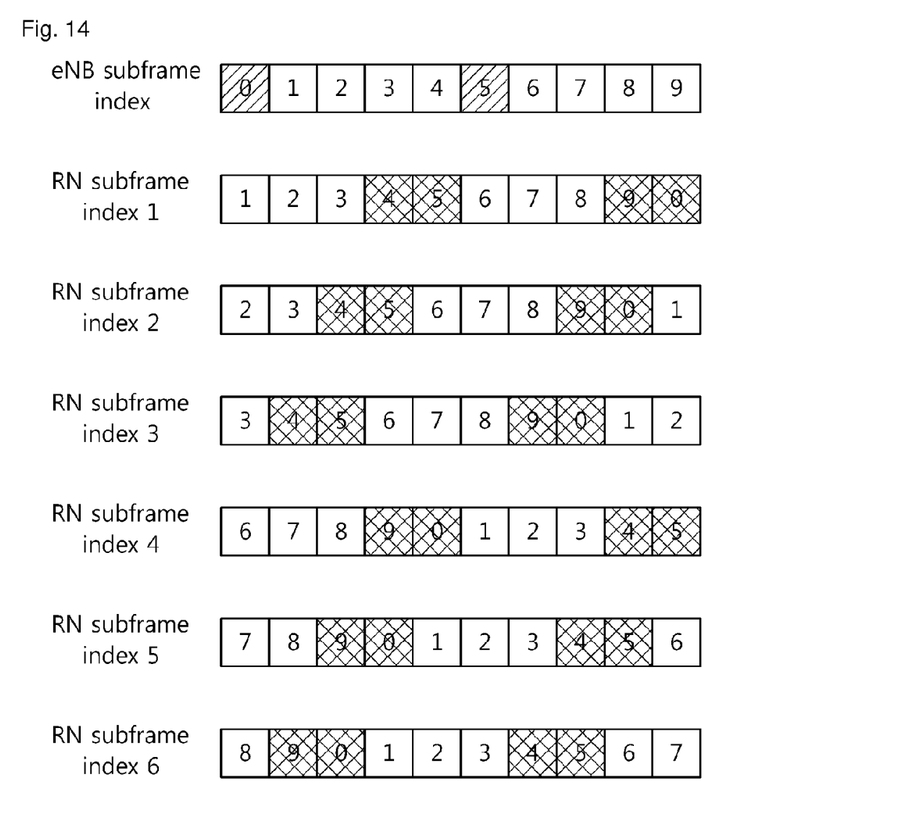
FIG. 14 is a diagram showing relationship between eNB subframe index and RN subframe indices.

FIG. 14 is a diagram showing relationship between BS subframe index and RN subframe indices.

A RN operates in some subframes (e.g., subframes #0 and #5 in the serving cell) to receive some important control signals (e.g., BCH) which is transmitted from the BS while keeping the relaying mode in the other subframes.

As a RN cannot receive the backhaul signal in subframes whose subframe numbers are #0, #4, #5, or #9 in FDD and #0, #1, #5, or #6 in TDD in the RN cell, it is possible to have some subframe offset between the BS cell and the RN cell such that BS cell's subframes #0 and #5 do not coincide with RN cell's subframes where the RN cannot receive the backhaul signal. FIG. 14 shows several examples of this subframe offset in FDD. It is possible for BS to configure each RN's subframe index via high layer signaling.

If subframes #0 and #5 of the BS are not configured for the backhaul link to a specific RN, then the RN may change its MBSFN subframe configuration such that those two subframes become the MBSFN subframes in the RN cell. The subframes #0 and #5 become reserved subframes.

It is beneficial in that it does not make an impact on the relay UEs measurement performance. However, if this impact is in an acceptable level, then, for the promptness and simplicity of the failure recovery, RN may receive backhaul signal in those two subframes without changing its MBSFN configuration. Once RN receives BCH, then it can attempt re-access to the BS e.g., by sending a proper random access preamble.

Now, here is a method which is particularly effective to the case where the backhaul subframe does not contain CRS, i.e., the case where the backhaul signal is demodulated by DM RS without having CRS. The current Rel-8/9 LTE specification defines the fallback mode to which BS and UE transit if a given number of consecutive errors are detected. In this fallback mode, the most reliable transmission/reception method (e.g., transmission diversity via space-frequency block code) is used. However, if RN is operating in the DM RS based backhaul link, then the existing fallback mode may not be supported as CRS may not exist the backhaul subframes.

A RN may use one or more subframes as the backup subframes. It is desirable that these backup subframes contain CRS. These backup subframes are not used for backhaul subframe, i.e., RN does not receive backhaul signal but transmits its access link signal at these backup subframes in the normal relaying operation. If RN detects the link failure, then it attempts to receive DL control signals in these backup subframes with the fallback mode before recovering backhaul link failure. If BS does not receive any response from RN, then it transmits a proper DL control signal in these backup subframes. BS may send the backup subframe indices to RN via high layer signaling. If RN does not receive any corresponding DL control signal from the BS in these backup subframes, then it may go into the UE mode in some or all subframes.

Figure 15:
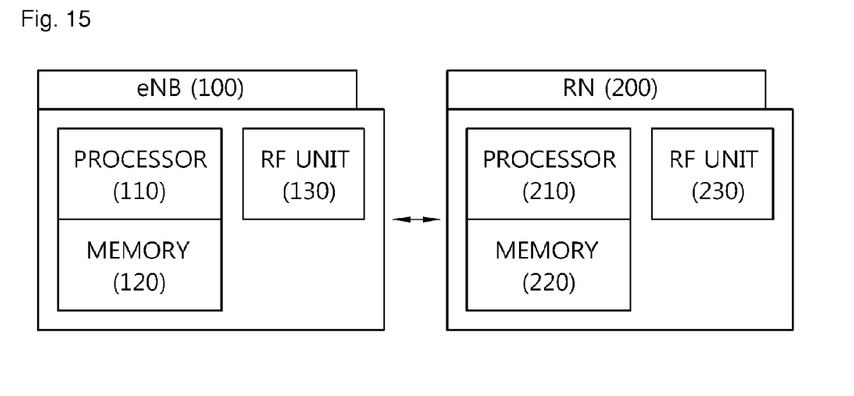
FIG. 15 is a block diagram showing a base station and a relay node.

FIG. 15 is a block diagram showing a BS and an RN.

A BS 100 includes a processor 110, a memory 120, and a radio frequency (RF) unit 130. The processor 110 implements the proposed functions, processes, and/or methods. The memory 120 is connected to the processor 110 and configured to store various pieces of information for driving the processor 110. The RF unit 130 is connected to the processor 110 and configured to send or receive or both a radio signal.

A RN 200 includes a processor 210, a memory 220, and an RF unit 230. The processor 210 implements the proposed functions, processes, and/or methods. That is, the processor 210 detects backhaul link failure, changes operation mode from relay mode to UE mode in which the RN performs same operation as a UE directly connected to a BS of the UE and accesses to the BS of the RN to re-connect. The memory 220 is connected to the processor 210 and configured to store various pieces of information for driving the processor 210. The RF unit 230 is connected to the processor 210 and configured to send or receive or both a radio signal.

The processor 110, 210 can include an Application-Specific Integrated Circuit (ASIC), other chipset, a logic circuit, a data processor and/or a converter for mutually converting a baseband signal and a radio signal. The memory 120, 220 can include Read-Only Memory (ROM), Random Access Memory (RAM), flash memory, a memory card, a storage medium and/or other storage devices. The RF unit 130, 230 can include one or more antennas for sending or receiving or both a radio signal. When the embodiments are implemented in software, the above schemes can be implemented by a module (or a process or a function) to perform the above functions. The module can be stored in the memory 120, 220 and executed by the processor 110, 210. The memory 120, 220 can be disposed inside or outside the processor 110, 210 and connected to the processor 110, 210 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for recovering a backhaul link failure between a base station (BS) and a relay node (RN), the method comprising:
receiving, by a RN from a BS, information on a plurality of relay subframes used for relaying signals between the BS and the RN;
detecting, by the RN, a backhaul link failure while trying to relay the signals by using the plurality of relay subframes;
when the backhaul link failure is detected, disabling the plurality of relay subframes by the RN and determining at least one subframe; and
receiving, by the RN from the BS, information to recover the backhaul link failure in the at least one subframe.

2. The method of claim 1, further comprising:
receiving, by the RN from the BS, information on the at least one subframe.

3. The method of claim 1, wherein the at least one subframe is predefined.

4. The method of claim 3, wherein the at least one subframe includes a first and sixth subframe of a radio frame.

5. The method of claim 1, wherein the information to recover the backhaul link failure includes information related to a random access preamble.

6. The method of claim 1, wherein the backhaul link failure is detected when the RN does not receive any downlink (DL) control signal from the BS during a given period of time, when the RN does not receive any uplink (UL) grant from the BS within a given period of time, or when the RN fails to decode a given consecutive number of DL data packets.

7. An apparatus for recovering a backhaul link failure with a base station (BS), the apparatus comprising:
a radio frequency unit configured to send and receive radio signals; and
a processor operatively connected to the radio frequency unit and configured to:
receive, from a BS, information on a plurality of relay subframes used for relaying signals;
detect a backhaul link failure while trying to relay the signals by using the plurality of relay subframes;
when the backhaul link failure is detected, disable the plurality of relay subframes and determine at least one subframe; and
receive, from the BS, information to recover the backhaul link failure in the at least one determined subframe.

8. The apparatus of claim 7, wherein the processor is configured for receiving, from the BS, information on the at least one subframe.

9. The apparatus of claim 7, wherein the at least one subframe is predefined.

10. The apparatus of claim 9, wherein the at least one subframe includes a first and sixth subframe of a radio frame.

11. The apparatus of claim 7, wherein the information to recover the backhaul link failure includes information related to a random access preamble.

12. The apparatus of claim 7, wherein the backhaul link failure is detected when the RN does not receive any downlink (DL) control signal from the BS during a given period of time, when the RN does not receive any uplink (UL) grant from the BS within a given period of time, or when the RN fails to decode a given consecutive number of DL data packets.

* * * * *